(12) United States Patent
Lu et al.

(10) Patent No.: US 10,880,872 B2
(45) Date of Patent: *Dec. 29, 2020

(54) METHOD FOR PROCESSING MEDIUM ACCESS CONTROL ENTITY, UE AND COMMUNICATION SYSTEM

(71) Applicant: FUJITSU LIMITED, Kawasaki (JP)

(72) Inventors: Yanling Lu, Beijing (CN); Weiwei Wang, Beijing (CN)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/454,630

(22) Filed: Jun. 27, 2019

(65) Prior Publication Data

US 2019/0320426 A1 Oct. 17, 2019

Related U.S. Application Data

(63) Continuation of application No. 14/871,331, filed on Sep. 30, 2015, now Pat. No. 10,383,095, which is a
(Continued)

(51) Int. Cl.
*H04W 72/04* (2009.01)
*H04W 76/27* (2018.01)
(Continued)

(52) U.S. Cl.
CPC ....... *H04W 72/0406* (2013.01); *H04L 1/1812* (2013.01); *H04L 61/6022* (2013.01);
(Continued)

(58) Field of Classification Search
CPC .................................................... H04W 72/12
See application file for complete search history.

(56) References Cited

U.S. PATENT DOCUMENTS

| 6,643,513 B2 | 11/2003 | Timonen et al. |
| 2008/0188220 A1 | 8/2008 | DiGirolamo et al. |

(Continued)

FOREIGN PATENT DOCUMENTS

| CN | 1997215 A | 7/2007 |
| CN | 101425884 A | 5/2009 |

(Continued)

OTHER PUBLICATIONS

Non-Final Office Action issued by the United States Patent and Trademark Office for corresponding U.S. Appl. No. 14/871,331, electronically dated May 5, 2017.
(Continued)

*Primary Examiner* — Sulaiman Nooristany
(74) *Attorney, Agent, or Firm* — Myers Wolin, LLC

(57) ABSTRACT

A method for processing a medium access control entity, UE and a communication system. The method includes: establishing a corresponding medium access control entity by UE for a second connectivity, so that there exists dual connectivity between the UE and network side including a first connectivity and the second connectivity; wherein the medium access control entity of the second connectivity at least includes a multiplexing or de-multiplexing module and a logic channel prioritization module.

7 Claims, 11 Drawing Sheets

```
                                    1001
establishing, by UE, a corresponding MAC entity for
  the second connectivity, so that there exists dual
  connectivity between the UE and network side 1002
  releasing, by the UE, the MAC entity of the second
                    connectivity
```

Related U.S. Application Data continuation of application No. PCT/CN2013/074092, filed on Apr. 11, 2013.

(51) Int. Cl.
| | |
|---|---|
| *H04W 76/11* | (2018.01) |
| *H04W 72/12* | (2009.01) |
| *H04L 1/18* | (2006.01) |
| *H04L 29/12* | (2006.01) |
| *H04W 88/02* | (2009.01) |
| *H04W 92/10* | (2009.01) |

(52) U.S. Cl.
CPC ........ *H04W 72/1242* (2013.01); *H04W 76/11* (2018.02); *H04W 76/27* (2018.02); *H04W 88/02* (2013.01); *H04W 92/10* (2013.01)

(56) References Cited

U.S. PATENT DOCUMENTS

| | | | |
|---|---|---|---|
| 2009/0186624 | A1 | 7/2009 | Cave et al. |
| 2009/0268674 | A1 | 10/2009 | Liu et al. |
| 2011/0170495 | A1 | 7/2011 | Earnshaw et al. |
| 2011/0230220 | A1 | 9/2011 | Chen |
| 2012/0140743 | A1* | 6/2012 | Pelletier ................ H04W 76/15 370/335 |
| 2012/0177042 | A1 | 7/2012 | Berman |
| 2012/0294213 | A1 | 11/2012 | Chen et al. |
| 2013/0223409 | A1 | 8/2013 | Jung et al. |
| 2015/0181593 | A1* | 6/2015 | Kim ...................... H04W 48/16 370/329 |
| 2015/0208458 | A1 | 7/2015 | Pelletier et al. |
| 2017/0140743 | A1* | 5/2017 | Gouyon ............. G06Q 30/0255 |

FOREIGN PATENT DOCUMENTS

| | | |
|---|---|---|
| CN | 201515499 U | 6/2010 |
| CN | 102123512 A | 7/2011 |
| CN | 102655448 A | 9/2012 |
| EP | 2 437 552 A1 | 4/2012 |
| JP | 2005-510152 A | 4/2005 |
| KR | 10-2011-0104915 A | 9/2011 |
| WO | 2011/069378 A1 | 6/2011 |
| WO | 2011/134493 A1 | 11/2011 |
| WO | 2012/023839 A2 | 2/2012 |
| WO | 2012/023839 A3 | 2/2012 |
| WO | 2012/060655 A2 | 5/2012 |
| WO | 2012/074878 A2 | 6/2012 |

OTHER PUBLICATIONS

Final Office Action issued by the United States Patent and Trademark Office for corresponding U.S. Appl. No. 14/871,331, electronically dated Nov. 30, 2017.

Non-Final Office Action issued by the United States Patent and Trademark Office for corresponding U.S. Appl. No. 14/871,331, electronically dated Jul. 18, 2018.

Final Office Action issued by the United States Patent and Trademark Office for corresponding U.S. Appl. No. 14/871,331, electronically dated Jan. 3, 2019.

International Search Report issued for corresponding International Patent Application No. PCT/CN2013/074092, dated Jan. 16, 2014, with an English translation.

3GPP TS 36.331 V11.3.0 "3rd Generation Partnership Project; Technical Specification Group Radio Access Network; Evolved Universal Terrestrial Radio Access (E-UTRA); Radio Resource Control (RRC); Protocol specification (Release 11)", Mar. 2013.

3GPP TS 36.321 V11.2.0 "3rd Generation Partnership Project; Technical Specification Group Radio Access Network; Evolved Universal Terrestrial Radio Access (E-UTRA); Medium Access Control (MAC) protocol specification (Release 11)", Mar. 2013.

3GPP TS 36.300 V11.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Mar. 2013.

Korean Intellectual Property Office Notice of Preliminary Rejection issued for corresponding Korean Patent Application No. 10-2015-7030248, dated Apr. 21, 2016, with English translation attached.

Research in Motion: 3GPP TSG RAN WG2 Meeting #81; St. Julian's, Malta, Jan. 28-Feb. 1, 2013; Title: "Discussion on Protocol Stack Support in Small Cell eNB"; Source: Research in Motion, UK Limited; Agenda Item: 7.2; Document for: Discussion; R2- 130068 S.

Extended European search report with supplementary European search report and the European search opinion issued by the European Patent Office for corresponding European Patent Application No. 13882041.0, dated Oct. 5, 2016.

3GPP TS 36.321 V11.1.0 "3rd Generation Partnership Project;Technical Specification Group Radio Access Network; Evolved Universal Terrestrial Radio Access (E-UTRA); Medium Access Control (MAC) protocol specification (Release 11)", Dec. 2012.

Notice of Preliminary Rejection issued by the Korean Intellectual Property Office for corresponding Korean Patent Application No. 10-2015-7030248, dated Oct. 31, 2016, with English translation.

Notice of Reason for Rejection issued by the Japan Patent Office for corresponding Japanese Patent Application No. 2016-506747, dated Nov. 15, 2016, with an English translation.

Samsung, "Discussion on inter-ENB Carrier Aggregation", Agenda Item: 7.2, 3GPP TSG-RAN2 Meeting #81bis, R2-131069, Chicago, US, Apr. 15-19, 2013.

Notice of Preliminary Rejection issued by the Korean Intellectual Property Office for corresponding Korean Patent Application No. 10-2017-7014674, dated Jun. 8, 2017, with English translation.

Notification of Reasons for Refusal issued by the Japan Patent Office for corresponding Japanese Patent Application No. 2017-091730, dated Jul. 10, 2018, with an English translation.

First Notification of Office Action issued by the State Intellectual Property Office of China for corresponding Chinese Patent Application No. 201380074780.8, dated Aug. 10, 2018, with an English translation.

Search Report issued by the State Intellectual Property Office of China for corresponding Chinese Patent Application No. 201380074780.8, dated Aug. 10, 2018, with an English translation.

Second Notification of Office Action issued by the China National Intellectual Property Administration for corresponding Chinese Patent Application No. 201380074780.8, dated Mar. 1, 2019, with an English translation.

* cited by examiner

801 establishing, by UE, a corresponding MAC entity for a second connectivity, so that there exists dual connectivity between the UE and network side including a first connectivity and the second connectivity with functions weaker than those of the first connectivity; wherein the MAC entity of the second connectivity at least includes a multiplexing or de-multiplexing module and a logic channel prioritization module

Fig. 8

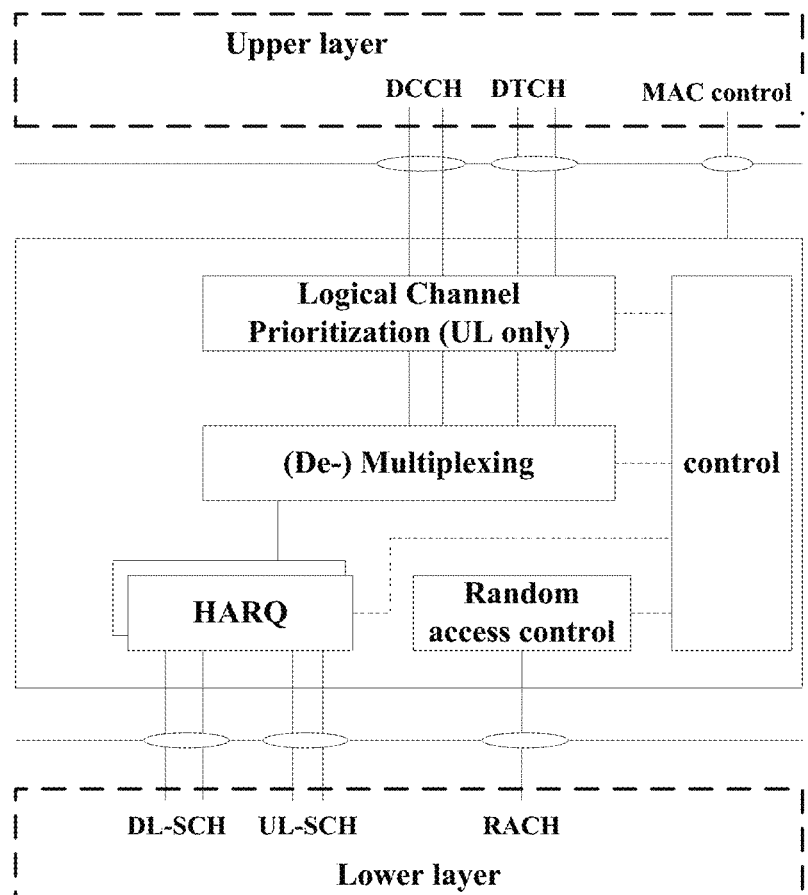

Fig. 9

METHOD FOR PROCESSING MEDIUM ACCESS CONTROL ENTITY, UE AND COMMUNICATION SYSTEM

CROSS REFERENCE TO RELATED APPLICATIONS

This application is a continuation of U.S. application Ser. No. 14/871,331, filed Sep. 30, 2015 which is a continuation application of International Application PCT/CN2013/074092 filed on Apr. 11, 2013 the entire contents of each are incorporated herein by reference.

TECHNICAL FIELD

The present disclosure relates to the field of communications, and in particular to a method for processing a medium access control (MAC) entity, UE and a communication system.

BACKGROUND

In an LTE-A system, user equipment (UE, which may also be referred to as a terminal) communicates with a base station mainly via an air interface. An air interface protocol includes a control plane and a data plane (or may be named as a user plane); wherein, the control plane is mainly used to generate and transmit control information of the air interface, and the user plane is mainly used to transmit user data.

FIG. 1 is a schematic diagram of a structure of the control plane protocol between the UE and the base station, and FIG. 2 is a schematic diagram of a structure of the user plane protocol between the UE and the base station. As shown in FIGS. 1 and 2, the UE side has a corresponding MAC layer, no matter it is a user plane or a control plane. Actually, in a particular implementation of equipment, the MAC layer is shared by the user plane and the control plane.

FIG. 3 is a schematic diagram of a structure of the MAC layer at the UE side. As shown in FIG. 3, a rightmost control module controls all other entities in the MAC layer. A random access control module at the lower right side controls a random access procedure. A hybrid automatic repeat request (HARQ) module at the lower left side performs uplink and downlink HARQ operations. A (de)multiplexing module at the middle is dual connectivity, in a downlink, performs de-multiplexing on an MAC protocol data unit (PDU), after completion of the de-multiplexing, transmits related data to a corresponding downlink CCCH, a downlink DCCH and a downlink DTCH, and in an uplink, performs multiplexing on data from an uplink CCCH, an uplink DCCH and an uplink DTCH and MAC layer control information elements, so as to generate the MAC PDU. A leftmost de-multiplexing module is only for a downlink, performs de-multiplexing on data transmitted by an MCH, and transmits respectively to an MCCH and an MTCH. And an upmost logical channel prioritization module is only for an uplink, and processes data and MAC layer control information elements from different logical channels by using different priorities according to a prioritization rule.

In an existing LTE-A CA system, there are mainly two operations on an MAC layer: reconfiguration and resetting. During reconfiguration, related configurations of the MAC layer are increased, modified or deleted; for example, during the reconfiguration, if a secondary cell is increased, the MAC layer needs to initialize a corresponding HARQ entity, because each secondary cell needs different HARQ entities.

When a secondary cell is removed, a corresponding HARQ entity should also be removed, as if this HARQ entity is not removed, a resource of the UE will be occupied. During resetting of the MAC layer, a timer of the MAC layer is stopped, and all related procedures are performed such operations as cancellation, etc, with a main object being to make settings of the MAC layer be in an initial known state. However, during the resetting, such operations as initialization or removal, etc., like those performed on an HARQ entity, are not performed on other entities in the MAC layer; that is, the entities other than the HARQ entities in the MAC layer still exist after resetting of the MAC layer. Viewing the MAC layer as a whole, after resetting of the MAC layer, the MAC entity still exists.

In an LTE-A system, the UE has two states: a connected state and an idle state. In the connected state, the UE may exchange specific data with the network side; and in the idle state, the UE may only receive broadcast or multicast data from the network side. When the UE is transferred from the idle state to the connected state, the network side needs to configure the UE with multiple specific radio resources, and the UE itself also needs to configure the connected state with specific resources, such as establishing related entities and starting a related timer; on the contrary, when the UE is transferred from the connected state to the idle state, all the specific radio resources and the specific resources at the UE need to be released.

In non-patent document 1, actions of the UE in leaving the connected state are provided, including: resetting an MAC entity; stopping all other timers in operation other than T320, T325 and T330; and releasing all radio resources, including releasing all radio link control (RLC) entities where radio bearer has been established, MAC configuration, and associated packet data converge protocol (PDCP) entities, etc. It can be seen that when the UE leaves the connected state, all the other entities in the MAC layer other than the HARQ entity are not released or removed.

On the other hand, in a current LTE-A system, a macro cell is mainly deployed. As the increase of traffics in the future, in order to perform system payload bridging or expansion coverage, it is possible that small cells (such as micro cells or pico cells, femto cells, and remote radio heads (RRHs), etc.) are deployed. Covered areas of small cells are relatively small, but the number of them is relatively large.

However, it was found by the inventors that if deployment of a small cell is only performed simply, with no optimization of control, many problems shall be produced, such as multiple times of handover, increase of rate of drops, and increase of load of control signaling, etc. And if an existing protocol is followed, no an MAC entity shall be deleted or removed. How to establish or delete more than one piece of connectivity has not been studied in the prior art. Therefore, reduction of waste of UE resources on the basis of control optimization cannot be ensured, nor a processing ability of the UE can further be efficiently increased.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

Documents advantageous to the understanding of the present disclosure and conventional technologies are listed below, and are incorporated herein by reference, as they are fully described in this text.

Non-patent document 1: 3GPP TS 36.331 V11.3.0 (2013-03) Radio Resource Control (RRC) specification. (Release 11);

Non-patent document 2: 3GPP TS 36.321 V11.2.0 (2013-03). Medium Access Control (MAC) protocol specification (Release 11); and Non-patent document 3: 3GPP TS 36.300 V11.5.0 (2013-03) Overall description (Stage 2). (Release 11).

SUMMARY

Embodiments of the present disclosure provide a method for processing a medium access control entity, UE and a communication system, with an object being to reasonably establish or delete an MAC entity, and efficiently manage UE resources.

According to an aspect of the embodiments of the present disclosure, there is provided a method for processing a medium access control entity, including:

establishing, by UE, a corresponding medium access control entity for a second connectivity, so that there exists dual connectivity between the UE and network side including a first connectivity and the second connectivity with functions weaker than those of the first connectivity;

wherein the medium access control entity of the second connectivity at least includes a multiplexing or de-multiplexing module and a logic channel prioritization module.

According to another aspect of the embodiments of the present disclosure, there is provided a method for processing a medium access control entity, including:

releasing, by UE, a medium access control entity of a second connectivity;

wherein there exists dual connectivity between the UE and network side including a first connectivity and the second connectivity with functions weaker than those of the first connectivity, and the medium access control entity of the second connectivity at least includes a multiplexing or de-multiplexing module and a logic channel prioritization module.

According to a further aspect of the embodiments of the present disclosure, there is provided UE, including:

a connectivity establishing unit configured to establish a corresponding medium access control entity for a second connectivity, so that there exists dual connectivity between the UE and network side including a first connectivity and the second connectivity with functions weaker than those of the first connectivity;

wherein the medium access control entity of the second connectivity at least includes a multiplexing or de-multiplexing module and a logic channel prioritization module.

According to still another aspect of the embodiments of the present disclosure, there is provided UE, there existing dual connectivity between the UE and network side including a first connectivity and a second connectivity with functions weaker than those of the first connectivity, the UE including:

a connectivity releasing unit configured to release a medium access control entity of the second connectivity;

wherein the medium access control entity of the second connectivity at least includes a multiplexing or de-multiplexing module and a logic channel prioritization module.

According to still another aspect of the embodiments of the present disclosure, there is provided a communication system, including the UE as described above.

According to still another aspect of the embodiments of the present disclosure, there is provided a computer-readable program, wherein when the program is executed in UE, the program enables a computer to carry out the method for processing medium access control entities as described above in the UE.

According to still another aspect of the embodiments of the present disclosure, there is provided a storage medium in which a computer-readable program is stored, wherein the computer-readable program enables a computer to carry out the method for processing medium access control entities as described above in UE.

An advantage of the embodiments of the present disclosure exists in that by reasonably establishing or releasing an MAC entity in a dual connectivity architecture, waste of UE resources are reduced on the basis of control optimization.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated or reduced.

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

FIG. 8 is a flowchart of a method for processing an MAC entity of Embodiment 1 of the present disclosure;

FIG. 9 is a schematic diagram of a structure of an MAC entity of a second connectivity of Embodiment 1 of the present disclosure;

DETAILED DESCRIPTION

Figure 1:
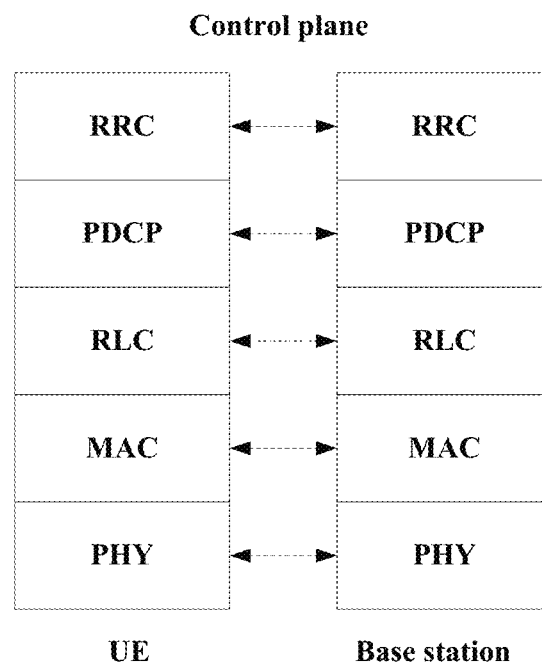
FIG. 1 is a schematic diagram of a structure of a control plane protocol between UE and a base station.
Figure 2:
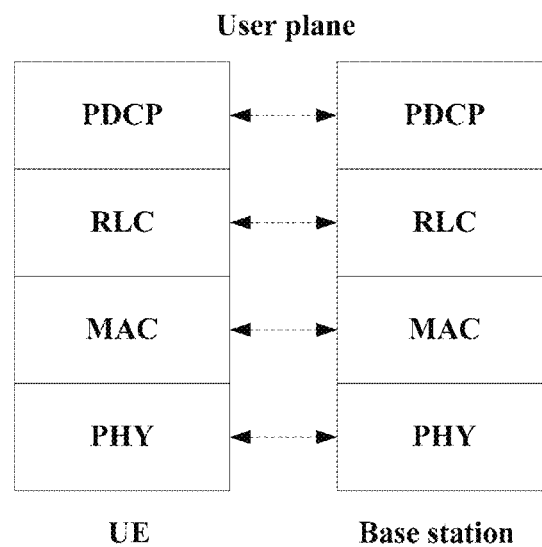
FIG. 2 is a schematic diagram of a structure of a user plane protocol between the UE and the base station.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the standardization organization, in order to resolve multiple problems existed in coexistence of macro cells and small cells, a dual connectivity architecture has been proposed. In the dual connectivity architecture, UE (or may also be referred to as a terminal) may simultaneously establish two or more pieces of connectivity with a network side. Typically, one piece of connectivity is between the UE and a macro cell base station, and the other piece is between the UE and a small cell base station, which may be respectively referred to as a first connectivity (such as macro connectivity) and a second connectivity (such as small connectivity) herein.

Generally, relative to the small connectivity, macro connectivity has stronger functions, and may have more control functions. For example, a radio resource control function of a control plane may only exist in the macro connectivity, or the radio resource control function in the macro connectivity may further have part of radio resource control function of the small connectivity, in addition to controlling the macro connectivity, or carry more channels, for example, the macro connectivity may carry a broadcast channel, and a paging channel, etc.; or carry more types of radio carriers, for example, the macro connectivity may carry signal radio bearer and data radio carriers; while the small connectivity can only carry data radio carriers.

It should be noted that the first connectivity of the present disclosure is not limited to be only between the UE and the macro cell base station, and the second connectivity is not limited to be only between the UE and the small cell base station. For example, the first connectivity may also exist between the UE and the small cell base station, and the second connectivity may also exist between the UE and the macro cell base station. In such a case, functions of the first connectivity between the UE and the small cell base station may be stronger than those of the second connectivity between the UE and the macro cell base station. However, the present disclosure is not limited thereto. The present disclosure shall be described in detail below only taking that the first connectivity is between the UE and the macro cell base station, and the second connectivity is between the UE and the small cell base station as an example. Furthermore, in an particular implementation, there may exist three or more pieces of connectivity between the UE and the network. And at this moment, only one of the pieces of connectivity is first connectivity, and others are all second connectivity. The contents of the present disclosure are also applicable to a case where there exist multiple pieces of connectivity.

In each piece of connectivity, there are multiple layers (such as a physical layer, an MAC layer, and an RLC layer, etc.) to fulfill functions of a control plane (related mainly to generation and transmission of air interface control signaling) and functions of a user plane (related mainly to transmission of air interface user data). In order to achieve the dual connectivity architecture, there are multiple pieces of selection for air interface protocol stack architectures. As the user plane and the control plane may use the same way of thinking for analysis of protocol stack architectures, description shall be given below taking the user plane as an example.

Figure 4:
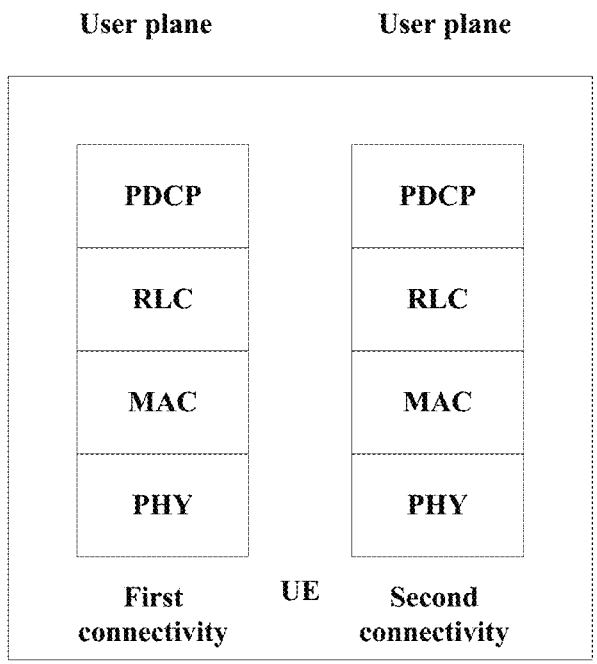
FIG. 4 is a schematic diagram of a structure of a user plane protocol stack at a UE side in an uplink.

FIG. 4 is a schematic diagram of a structure of a user plane protocol stack at a UE side in an uplink, in which a case where it is divided from a PDCP layer. As shown in FIG. 4, there exist distributed PDCP layers, RLC layers, MAC layers and PHY layers in both pieces of connectivity.

Figure 5:
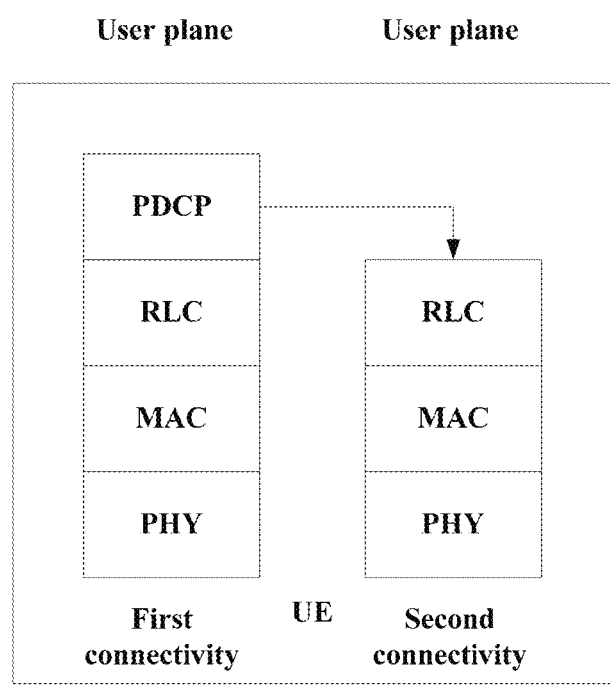
FIG. 5 is a schematic diagram of another structure of the user plane protocol stack at the UE side in the uplink.

FIG. 5 is a schematic diagram of another structure of the user plane protocol stack at the UE side in the uplink, in which a case where it is divided from an RLC layer. As shown in FIG. 5, there exist distributed RLC layers, MAC layers and PHY layers in both pieces of connectivity. But there exist concentrated PDCP layers in the UE, the PDCP layers being associated with the RLC layers in both pieces of connectivity.

Figure 6:
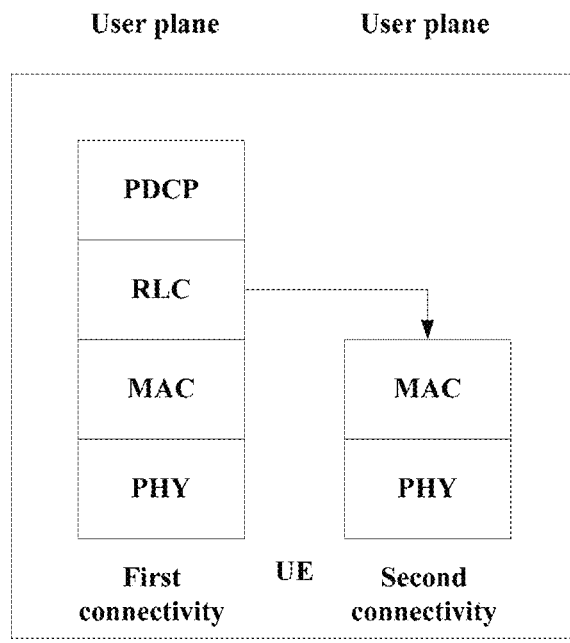
FIG. 6 is a schematic diagram of a further structure of the user plane protocol stack at the UE side in the uplink.

FIG. 6 is a schematic diagram of a further structure of the user plane protocol stack at the UE side in the uplink, in which a case where it is divided from an MAC layer. As shown in FIG. 6, there exist distributed MAC layers and PHY layers in both pieces of connectivity. But there exist concentrated PDCP layers and RLC layers in the UE, the RLC layers being associated with the MAC layers in both pieces of connectivity.

Figure 7:
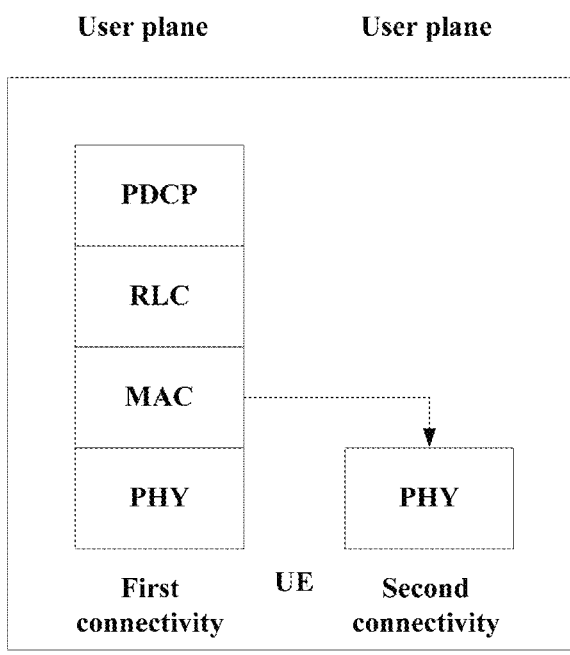
FIG. 7 is a schematic diagram of still another structure of the user plane protocol stack at the UE side in the uplink.

FIG. 7 is a schematic diagram of still another structure of the user plane protocol stack at the UE side in the uplink, in which a case where it is divided from a PHY layer. As shown in FIG. 7, there exist distributed PHY layers in both pieces of connectivity. But there exist concentrated PDCP layers, RLC layers and MAC layers in the UE.

As shown in FIG. 4-6, there exist two MAC entities in FIG. 4-6, one of which being in a macro connectivity, and the other being in a small connectivity. If such the dual connectivity architecture is established between one piece of UE and the network side, no an MAC entity shall be deleted or removed according to the provisions of an existing protocol when the UE leaves the connected state or releases the second connectivity. Two MAC entities need to be maintained when the UE is transferred into the idle state, this obviously wastes resources, and needs to be avoided.

Embodiment 1

An embodiment of the present disclosure provides a method for processing an MAC entity. FIG. 8 is a flowchart of the method for processing of the embodiment of the present disclosure. As shown in FIG. 8, the method includes:

step 801: establishing, by UE, a corresponding MAC entity for a second connectivity, so that there exists dual connectivity between the UE and network side including a first connectivity and the second connectivity with functions weaker than those of the first connectivity; wherein the MAC entity of the second connectivity at least includes a multiplexing or de-multiplexing module and a logic channel prioritization module.

In an implementation, the MAC entity of the second connectivity may further include a control module, and the MAC entity of the second connectivity and an MAC entity of the first connectivity are independently controlled by using control modules, respectively, thereby forming a completely independent distributed MAC structure.

Figure 3:
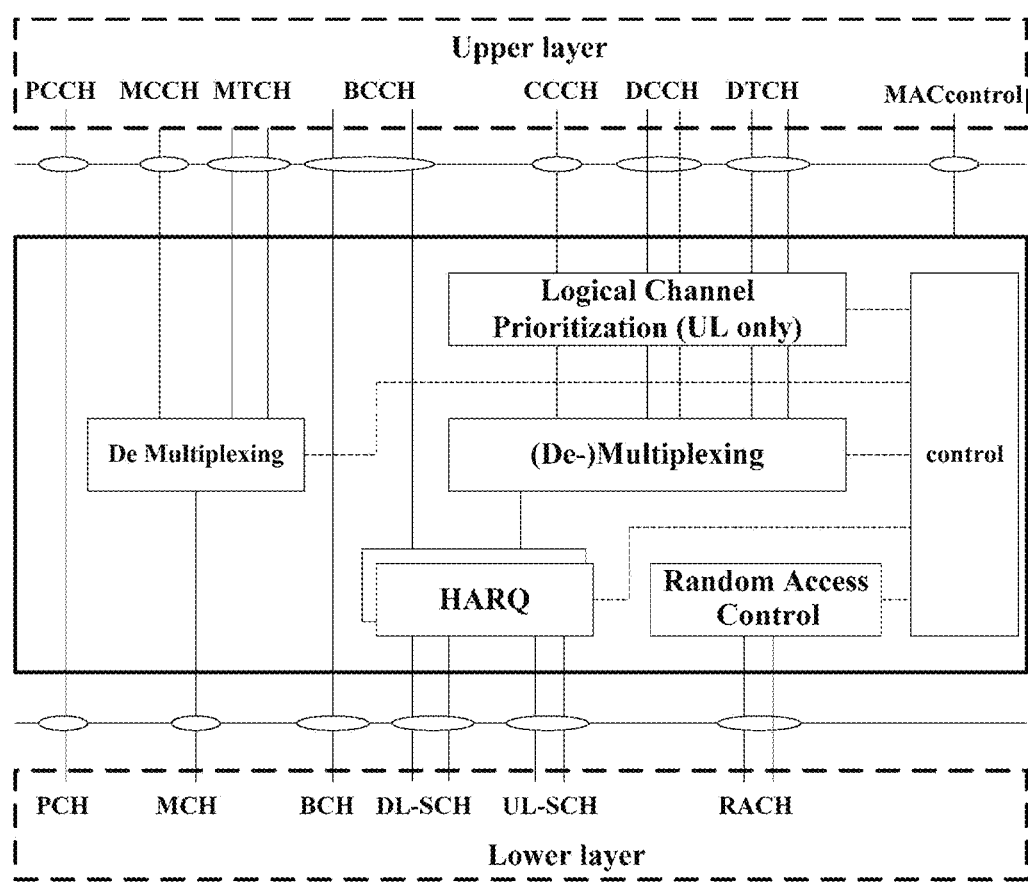
FIG. 3 is a schematic diagram of a structure of the MAC layer at a UE side.

In this implementation, the MAC entities in the two piece of connectivity are completely independent, that is, each MAC entity has its own independent control module. For example, the MAC entity of the first connectivity (a macro connectivity) may employ a structure in an existing protocol (such as the structure shown in FIG. 3), and the MAC entity of the second connectivity (a small connectivity) may employ the structure shown in FIG. 9.

FIG. 9 is a schematic diagram of a structure of the MAC entity of the second connectivity of the embodiment of the present disclosure. As shown in FIG. 9, a (de)multiplexing module and a logical channel prioritization module are under control of the control module in the MAC entity of the second connectivity, and operation is independent from the MAC layer of the first connectivity.

Furthermore, the MAC entity of the second connectivity may further include a random access control module and/or an HARQ module. As shown in FIG. 9, the HARQ module and the random access control module are also under the control of the control module in the MAC entity of the second connectivity, and operation is independent from the MAC layer of the first connectivity.

It should be noted that the present disclosure is not limited thereto, and the MAC entity of the second connectivity may have other implementations. In this implementation, the MAC entity of the second connectivity may at least include a control module, a (de)multiplexing module and a logical channel prioritization module. The relevant art may be referred to for particular structures or implementations of these modules.

In another implementation, the MAC entity of the second connectivity and the MAC entity of the first connectivity are controlled by using the same control module, thereby forming a semi-independent distributed MAC structure.

In this implementation, the MAC entities in the two piece of connectivity may be under control of the same control module. In this way, the control module controls two (de)multiplexing modules (each piece of connectivity corresponds to one) and two logical channel prioritization modules (each piece of connectivity corresponds to one).

Furthermore, if the second connectivity has a corresponding physical channel, the MAC entity will have a random access control module to which the second connectivity corresponds and an HARQ module to which the second connectivity corresponds. And at the same time, the control module controls the random access control module to which the second connectivity corresponds and the HARQ module to which the second connectivity corresponds.

In this implementation, the MAC entity of the second connectivity at least includes a (de)multiplexing module and a logical channel prioritization module. The (de)multiplexing module, the logical channel prioritization module, the random access control module and the HARQ module to which the second connectivity corresponds are also communicated in a certain structure. For example, they are controlled according to the structure shown in FIG. 9.

Hence, UE resource may be efficiently managed by reasonably establishing an MAC entity in the dual connectivity architecture.

Figure 10:
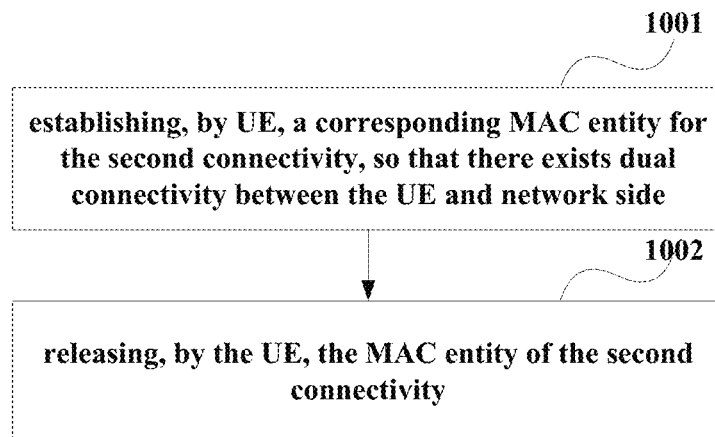
FIG. 10 is another flowchart of the method for processing an MAC entity of Embodiment 1 of the present disclosure.

FIG. 10 is another flowchart of the method for processing of the embodiment of the present disclosure. As shown in FIG. 10, the method includes:

step 1001: establishing, by UE, a corresponding MAC entity for the second connectivity, so that there exists dual connectivity between the UE and network side including a first connectivity and the second connectivity with functions weaker than those of the first connectivity; and step 1002: releasing, by the UE, the MAC entity of the second connectivity.

In this embodiment, if there exists the dual connectivity between the UE and the network side, the UE releases the MAC entity of the second connectivity when the UE receives an instruction for releasing the second connectivity or the UE is to leave a connected state. However, the condition for releasing the MAC entity of the second connectivity is not limited in the present disclosure, and other conditions may also be used.

In an implementation, the UE first releases the second connectivity, and then performs an operation of leaving the connected state, the operation of leaving the connected state being performed according to provisions of an existing protocol; for example, the process of releasing the second connectivity may include: releasing the MAC entity of the second connectivity, stopping a timer related to the second connectivity, and releasing all radio resource configuration related to the second connectivity.

In releasing the MAC entity of the second connectivity, if the MAC entity of the second connectivity employs a completely independent distributed MAC structure, i.e. including an independent control module, in releasing the MAC entity of the second connectivity, the control module, (de)multiplexing module and logical channel prioritization module of the MAC entity of the second connectivity shall be released. If a random access control module and/or an HARQ module are further included, the random access control module and/or the HARQ module shall also be released.

In implement of releasing the second connectivity, it may be provided in the process of "releasing the second connectivity" to release the MAC entity of the second connectivity, stop all timers related to the second connectivity except those that should be operated in the idle state, and release all radio resource configuration related to the second connectivity, including releasing all RLC entities in the second connectivity where radio bearer has been established and associated PDCP layer entities. Time orders of stopping the related timers and releasing the related entities (MAC entities, RLC entities and PDCP entities) here are not limited to what is described above, and may be adjusted in particular implementation according to an actual situation.

Thus, whether the UE has a dual connectivity architecture is judged when the UE receives a connection releasing message of the base station, or a higher layer of the UE requires to release connection, or the UE is handed over from an evolved universal terrestrial radio access (E-UTRA) system, or the UE receives another command requiring to leave the connected state. If there is a dual connectivity architecture, the second connectivity is released first, and then operations leaving the connected state is performed according to provisions of an existing protocol, including: resetting the MAC entity of the first connectivity; stopping all other timers other than T320, T325 and T330; releasing all radio resources of the first connectivity, including releasing all RLC entities where radio bearer has been established, MAC layer configuration and associated PDCP entities; and informing a higher layer that RRC connection has been released and informing a cause. If the cause of leaving an RRC connected state is neither receiving "a command of moving from E-UTRA", nor selecting a cross radio access technology (RAT) cell as the timer T311 is in operation, the UE enters into the idle state, and performs related operations according to relevant protocols.

In the implementation of releasing the MAC entity of the second connectivity, if the MAC entity of the second connectivity employs the semi-independent distributed MAC structure, that is, sharing a control module with the MAC entity of the first connectivity, in the process of releasing the second connectivity, a related MAC entity in the second connectivity is released, and at least the (de)multiplexing module and the logical channel prioritization module are released. And if a random access control module and/or an HARQ module is/are further included, the random access control module and/or the HARQ module is/are also released.

In implement of releasing the second connectivity, it may be provided in the process of "MAC reconfiguration" that when one piece of connectivity is released, the UE at least releases a corresponding (de)multiplexing module and a logical channel prioritization module to the released connectivity. And then it may be provided in the process of "releasing the second connectivity" to stop all other timers related to the second connectivity other than those that should be operated in the idle state, and release all radio resource configuration related to the second connectivity, including releasing all RLC entities in the second connectivity where radio bearer has been established and associated PDCP entities. Time orders of stopping the related timers and releasing the related entities (MAC entities, RLC entities and PDCP entities) here are not limited to what is described above, and may be adjusted in particular implementation according to an actual situation.

Thus, whether the UE has a dual connectivity architecture is judged when the UE receives a connection releasing message of the base station, or a higher layer of the UE requires to release connection, or the UE is handed over from an E-UTRA system, or the UE receives another command requiring to leave the connected state. If there is a dual connectivity architecture, the second connectivity is released first, and then operations leaving the connected state is performed according to provisions of an existing protocol, including: resetting the MAC entity of the first connectivity; stopping all other timers other than T320, T325 and T330; releasing all radio resources of the first connectivity, including releasing all RLC entities where radio bearer has been established, MAC layer configuration and associated PDCP entities; and informing a higher layer that RRC connection has been released and informing a cause. If the cause of leaving an RRC connected state is neither receiving "a command of moving from E-UTRA", nor selecting a cross RAT cell as the timer T311 is in operation, the UE enters into the idle state, and performs related operations according to relevant protocols.

In another implementation, the UE may release the second connectivity and perform the operation leaving the connected state at the same time.

In the implementation of releasing the MAC entity of the second connectivity, if the MAC entity of the second connectivity employs the completely independent distributed MAC structure, that is, an independent control module is included, the UE needs to release the MAC entity to which the second connectivity corresponds, including at least releasing the control module, the (de)multiplexing module and logical channel prioritization module of the MAC entity of the second connectivity. And if a random access control module and/or an HARQ module is/are further included, the random access control module and/or the HARQ module is/are also released. If the MAC entity of the second connectivity employs the semi-independent distributed MAC structure, that is, sharing a control module with the MAC entity of the first connectivity, the UE needs to release the MAC entity to which the second connectivity corresponds, such as a (de)multiplexing module and a logical channel prioritization module. And if a random access control module and/or an HARQ module is/are further included, the random access control module and/or the HARQ module is/are also released.

In implementation, judgment may first be performed at the start of the existing "action of leaving connection of terminal" process, so as to judge whether there exists a dual connectivity architecture. If there exists a dual connectivity architecture, the MAC entity to which the second connectivity corresponds is released, and then remaining operations of releasing the second connectivity and the operation of leaving the connected state are performed at the same time, including: resetting the MAC entity to which the first connectivity corresponds, stopping at the same time all other timers to which the two pieces of connectivity correspond other than those that should be operated in the idle state, and releasing all radio resources related to the two pieces of connectivity. All the radio resources related to the two pieces of connectivity include MAC layer configuration of the first connectivity, RLC entities in the two pieces of connectivity where radio bearer has been established and associated PDCP entities. Then subsequent actions leaving the connected state are performed. Time orders of stopping the related timers and releasing the related radio resources (MAC layer configuration, RLC entities and PDCP entities, etc.) here are not limited to what is described above, and may be adjusted in particular implementation according to an actual situation.

Thus, whether the UE has a dual connectivity architecture is judged when the UE receives a connection releasing message of the base station, or a higher layer of the UE requires to release connection, or the UE is handed over from an E-UTRA system, or the UE receives another command requiring to leave the connected state. If there is a dual connectivity architecture, the MAC entity to which the second connectivity corresponds is released, then the MAC entity to which the first connectivity corresponds is reset, thereafter, all timers to which the two pieces of connectivity correspond other than those that should be operated in the idle state are stopped at the same time, and all radio resources related to the two pieces of connectivity are released. All the radio resources related to the two pieces of connectivity include MAC layer configuration of the first connectivity, RLC entities in the two pieces of connectivity where radio bearer has been established and associated PDCP entities. Then RRC connection having been released is informed to a higher layer and a cause is informed. If the cause of leaving an RRC connected state is neither receiving "a command of moving from E-UTRA", nor selecting a cross RAT cell as the timer T311 is in operation, the UE enters into the idle state, and performs related operations according to relevant protocols.

In another implementation, the UE releases the MAC entity of the second connectivity in receiving an instruction of releasing the second connectivity; for example, the instruction of releasing the second connectivity may be from the base station, and may also be from internal of the UE, such as releasing the second connectivity resulted from other operations of the UE. In a particular implementation, the method may further include: stopping timers related to the second connectivity, and releasing all radio resources related to the second connectivity, including releasing all RLC entities in the second connectivity where radio bearer has been established and associated PDCP entities. Time orders of stopping the related timers and releasing the related entities (MAC entities, RLC entities and PDCP entities) here are not limited to what is described above, and may be adjusted in particular implementation according to an actual situation.

In the implementation of releasing the MAC entity of the second connectivity, if the MAC entity of the second connectivity employs the completely independent distributed MAC structure, that is, an independent control module is included, the UE needs to release the MAC entity to which the second connectivity corresponds, including at least releasing the control module, the (de)multiplexing module and logical channel prioritization module of the MAC entity of the second connectivity. And if a random access control module and/or an HARQ module is/are further included, the random access control module and/or the HARQ module is/are also released. If the MAC entity of the second connectivity employs the semi-independent distributed MAC structure, that is, sharing a control module with the MAC entity of the first connectivity, the UE needs to release the MAC entity to which the second connectivity corresponds, such as a (de)multiplexing module and a logical channel prioritization module. And if a random access control module and/or an HARQ module is/are further included, the random access control module and/or the HARQ module is/are also released.

It can be seen from the above embodiment that by reasonably establishing or releasing the MAC entity to which the second connectivity corresponds in the dual connectivity architecture, the UE resources may be efficiently managed, and waste of resources may be reduced based on control optimization.

Embodiment 2

An embodiment of the present disclosure provides a method for processing an MAC entity, in which releasing MAC entities is described in a case where a dual connectivity architecture exists between UE and the network side, with contents identical to those in Embodiment 1 being not going to be described any further.

Figure 11:
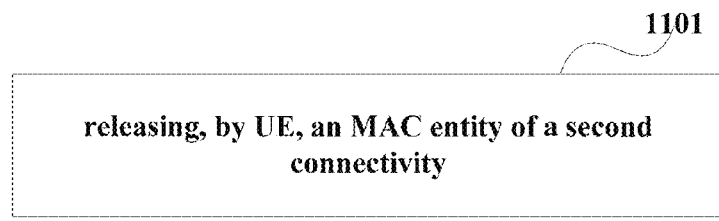
FIG. 11 is a flowchart of a method for processing an MAC entity of Embodiment 2 of the present disclosure.

FIG. 11 is a flowchart of the method for processing of the embodiment of the present disclosure. As shown in FIG. 11, the method includes:

step 1101: releasing, by UE, an MAC entity of a second connectivity;

wherein there exists dual connectivity between the UE and network side including a first connectivity and the second connectivity with functions weaker than those of the first connectivity, and the MAC entity of the second connectivity at least includes a multiplexing or de-multiplexing module and a logic channel prioritization module.

In this embodiment, if there exists a dual connectivity architecture between the UE and the network side, the UE releases the MAC entity of the second connectivity when the UE receives an instruction for releasing the second connectivity or the UE is to leave a connected state. However, the condition for releasing the MAC entity of the second connectivity is not limited in the present disclosure, and other conditions may also be used.

Figure 12:
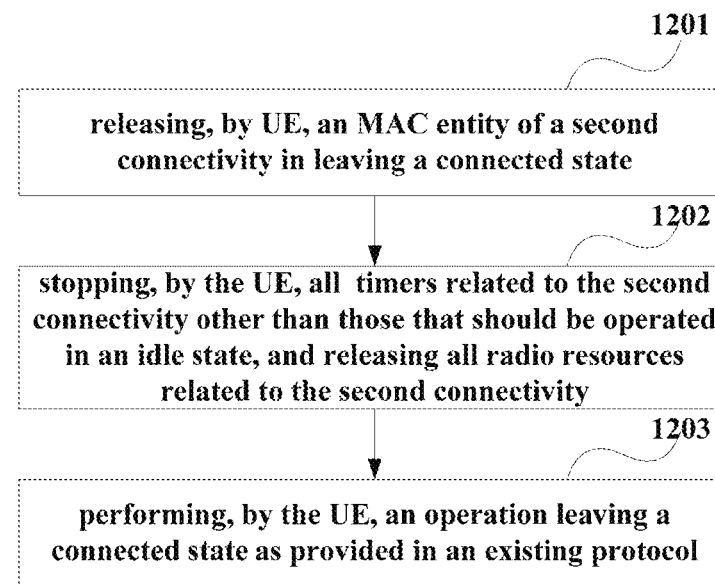
FIG. 12 is another flowchart of the method for processing an MAC entity of Embodiment 2 of the present disclosure.

In an implementation, the UE may first release the second connectivity, and then performs an operation of leaving the connected state as provided in an existing protocol. FIG. 12 is another flowchart of the method for processing of the embodiment of the present disclosure. As shown in FIG. 12, the method includes:

step 1201: releasing, by UE, an MAC entity of a second connectivity in leaving a connected state;

step 1202: stopping, by the UE, all other timers related to the second connectivity other than those that should be operated in an idle state, and releasing all radio resources related to the second connectivity, including releasing all RLC entities in the second connectivity where radio bearer has been established and associated PDCP entities;

here, time orders of stopping the related timers and releasing the related entities (MAC entities, RLC entities and PDCP entities, etc.) in steps 1201 and 1202 are not limited to what is described above, and may be adjusted in particular implementation according to an actual situation;

step 1203: performing, by the UE, an operation leaving a connected state, including: resetting an MAC entity of a first connectivity; stopping other timers in operation other than T320, T325 and T330; and releasing all radio resources related to the first connectivity, including releasing all RLC entities where radio bearer has been established, MAC configuration, and associated PDCP entities, etc.

In an particular implementation, the method may further include: informing a higher layer that RRC connection has been released and informing a cause; and if the cause of leaving an RRC connected state is neither receiving "a command of moving from E-UTRA", nor selecting a cross RAT cell as the timer T311 is in operation, entering into the idle state by the UE.

In particular, leaving the connected state by the UE in step 1201 may include: the UE receiving a connection releasing message of the base station, or a higher layer of the UE requiring to release connection, or the UE being handed over from an E-UTRA system, or the UE receiving another command requiring to leave the connected state.

Figure 13:
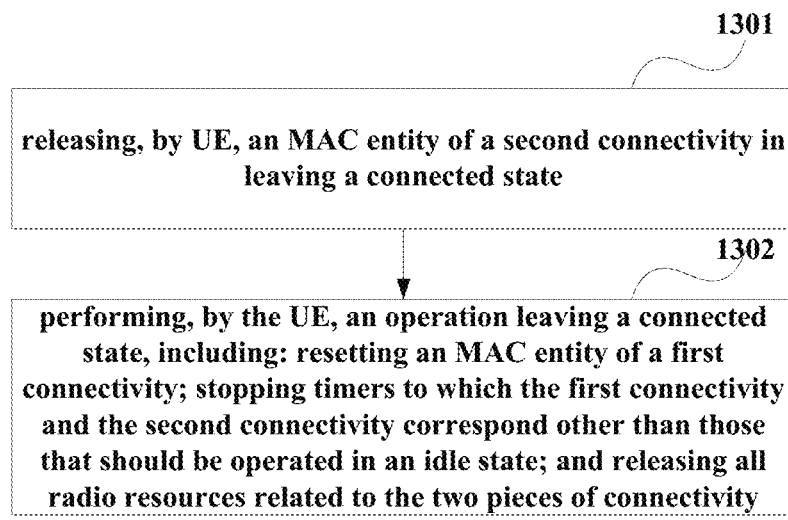
FIG. 13 is a further flowchart of the method for processing an MAC entity of Embodiment 2 of the present disclosure.

In another implementation, the UE may release the second connectivity and perform the operation leaving the connected state at the same time. FIG. 13 is a further flowchart of the method for processing of the embodiment of the present disclosure. As shown in FIG. 13, the method includes:

step 1301: releasing, by UE, an MAC entity of a second connectivity in leaving a connected state; and step 1302: performing, by the UE, an operation leaving a connected state, including: resetting an MAC entity of a first connectivity; stopping other timers to which the first connectivity and the second connectivity correspond other than those that should be operated in an idle state; and releasing all radio resources related to the two pieces of connectivity.

In an particular implementation, the method may further include: informing a higher layer that RRC connection has been released and informing a cause; and if the cause of leaving an RRC connected state is neither receiving "a command of moving from E-UTRA", nor selecting a cross RAT cell as the timer T311 is in operation, entering into the idle state by the UE.

In particular, leaving the connected state by the UE in step 1301 may include: the UE receiving a connection releasing message of the base station, or a higher layer of the UE requiring to release connection, or the UE being handed over from an E-UTRA system, or the UE receiving another command requiring to leave the connected state.

Figure 14:
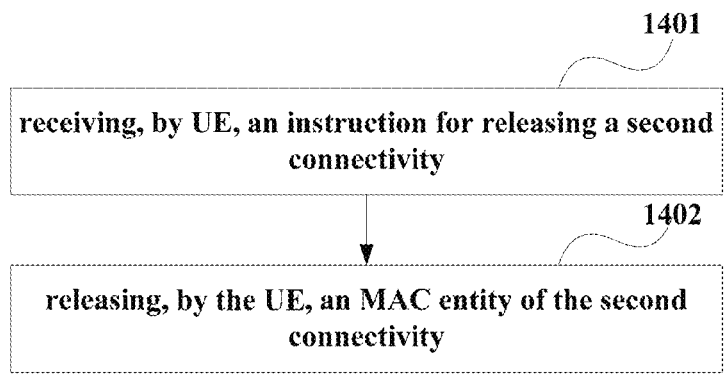
FIG. 14 is still another flowchart of the method for processing an MAC entity of Embodiment 2 of the present disclosure.

In another implementation, the UE releases the MAC entity of the second connectivity in receiving an instruction for releasing the second connectivity. FIG. 14 is still another flowchart of the method for processing of the embodiment of the present disclosure. As shown in FIG. 14, the method includes:

step 1401: receiving, by UE, an instruction for releasing a second connectivity;

wherein, the instruction may be from the base station, and may also be from internal of the UE, such as releasing the second connectivity resulted from other operations of the UE;

step 1402: releasing, by the UE, an MAC entity of the second connectivity.

In a particular implementation, the method may further include: stopping all timers related to the second connectivity, and releasing all radio resources related to the second connectivity, including releasing all RLC entities in the second connectivity where radio bearer has been established and associated PDCP entities. Time orders of stopping the related timers and releasing the related entities (such as MAC entities, RLC entities and PDCP entities, etc.) here are not limited to what is described above, and may be adjusted in particular implementation according to an actual situation.

In the implementation of releasing the MAC entity of the second connectivity, if the MAC entity of the second connectivity employs the completely independent distributed MAC structure, that is, an independent control module is included, the UE needs to release the MAC entity to which the second connectivity corresponds, including at least releasing a control module, a (de)multiplexing module and a logical channel prioritization module of the MAC entity of the second connectivity. And if a random access control module and/or an HARQ module is/are further included, the random access control module and/or the HARQ module is/are also released. If the MAC entity of the second connectivity employs the semi-independent distributed MAC structure, that is, sharing a control module with the MAC entity of the first connectivity, the UE needs to release MAC entities to which the second connectivity corresponds, such as a (de)multiplexing module and a logical channel prioritization module. And if a random access control module and/or an HARQ module is/are further included, the random access control module and/or the HARQ module is/are also released.

In this implementation, if the UE further receives an instruction for leaving the connected state, an action of releasing the second connectivity may also be induced. The action of releasing the second connectivity and the action of leaving the connected state may have two implementations: releasing the second connectivity first and then performing the action of leaving the connected state as provided in an existing protocol; or releasing MAC entity of the second connectivity first and then performing the action of leaving the connected state. The two implementations shown in FIGS. 12 and 13 may be referred to for a particular implementation.

Figure 15:
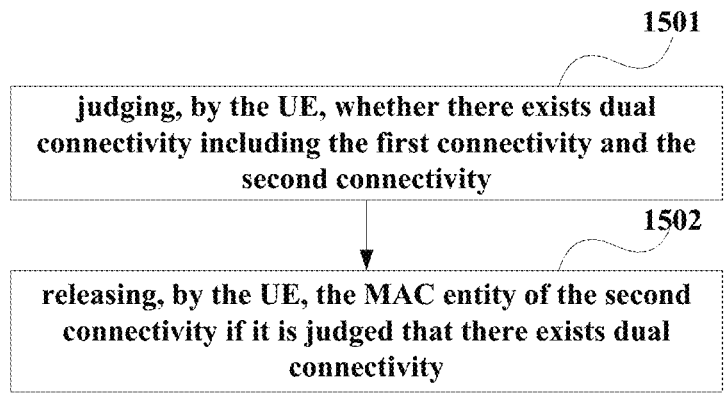
FIG. 15 is yet another flowchart of the method for processing an MAC entity of Embodiment 2 of the present disclosure.

In this embodiment, the UE may further judge whether there exists dual connectivity. FIG. 15 is still another flowchart of the method for processing of the embodiment of the present disclosure. As shown in FIG. 15, the method includes:

step 1501: judging, by the UE, whether there exists dual connectivity including the first connectivity and the second connectivity; and step 1502: releasing, by the UE, the MAC entity of the second connectivity if it is judged that there exists dual connectivity.

In a particular implementation, other conditions for releasing the MAC entity, such as "when leaving the connected state" or "when receiving releasing the second connectivity", etc., may also be added into step 1502. However, the present disclosure is not limited thereto, and a particular condition for releasing may be determined according to an actual situation.

It can be seen from the above embodiment that by releasing the MAC entity to which the second connectivity corresponds in the dual connectivity architecture, the UE resources may be efficiently managed, and waste of resources may be reduced based on control optimization.

Embodiment 3

An embodiment of the present disclosure provides UE, corresponding to the method for processing an MAC entity of Embodiment 1, with identical contents being not going to be described any further.

Figure 16:
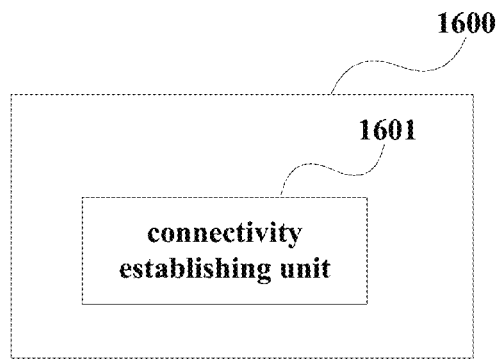
FIG. 16 is a schematic diagram of a structure of UE of Embodiment 3 of the present disclosure.

FIG. 16 is a schematic diagram of a structure of the UE of the embodiment of the present disclosure. As shown in FIG. 16, the UE 1600 includes a connectivity establishing unit 1601. The relevant art may be referred to for other parts of the UE 1600, which shall not be described herein any further.

In this embodiment, the connectivity establishing unit 1601 is configured to establish a corresponding MAC entity for a second connectivity, so that there exists dual connectivity between the UE and network side including a first connectivity and the second connectivity with functions weaker than those of the first connectivity; wherein the MAC entity of the second connectivity at least includes a multiplexing or de-multiplexing module and a logic channel prioritization module.

In an implementation, the MAC entity of the second connectivity may further include a control module, and the MAC entity of the second connectivity and an MAC entity of the first connectivity are independently controlled by using control modules, respectively, thereby forming a completely independent distributed MAC structure.

In another implementation, the MAC entity of the second connectivity and an MAC entity of the first connectivity are controlled by using a common control module, thereby forming a completely independent distributed MAC structure.

In a particular implementation, the MAC entity of the second connectivity may further include a random access control module and/or a hybrid automatic repeat request module. However, the present disclosure is not limited thereto, and a particular structure may be determined according to an actual situation.

Figure 17:
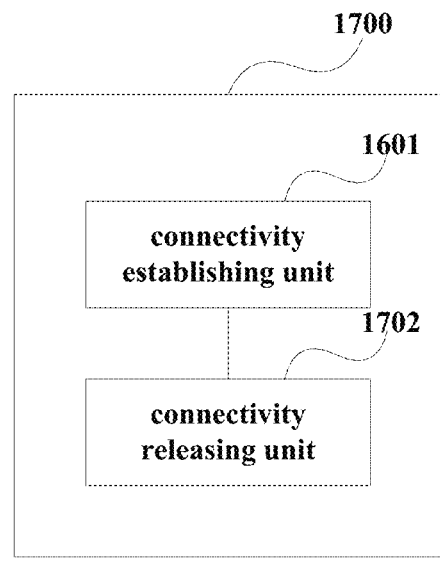
FIG. 17 is another schematic diagram of the structure of the UE of Embodiment 3 of the present disclosure.

FIG. 17 is another schematic diagram of the structure of the UE of the embodiment of the present disclosure. As shown in FIG. 17, the UE 1700 includes a connectivity establishing unit 1601, as described above.

As shown in FIG. 17, the UE 1700 may further include a connectivity releasing unit 1702. The connectivity releasing unit 1702 is configured to release the MAC entity of the second connectivity. For example, the MAC entity of the second connectivity may be released when the UE 1700 leaves a connected state, or the MAC entity of the second connectivity may be released when an instruction for releasing the second connectivity is received. However, the present disclosure is not limited thereto.

It can be seen from the above embodiment that by reasonably establishing or releasing the MAC entity to which the second connectivity corresponds in the dual connectivity architecture, the UE resources may be efficiently managed, and waste of resources may be reduced based on control optimization.

Embodiment 4

An embodiment of the present disclosure provides UE, corresponding to the method for processing an MAC entity of Embodiment 2, with identical contents being not going to be described any further.

Figure 18:
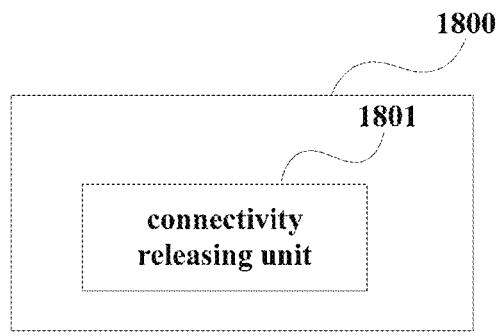
FIG. 18 is a schematic diagram of a structure of UE of Embodiment 4 of the present disclosure.

FIG. 18 is a schematic diagram of a structure of the UE of the embodiment of the present disclosure. As shown in FIG. 18, the UE 1800 includes a connectivity releasing unit 1801. The relevant art may be referred to for other parts of the UE 1800, which shall not be described herein any further.

In this embodiment, the connectivity releasing unit 1801 is configured to release an MAC entity of a second connectivity; wherein there exists dual connectivity between the UE and network side including a first connectivity and the second connectivity with functions weaker than those of the first connectivity, and the MAC entity of the second connectivity at least includes a multiplexing or de-multiplexing module and a logic channel prioritization module.

Figure 19:
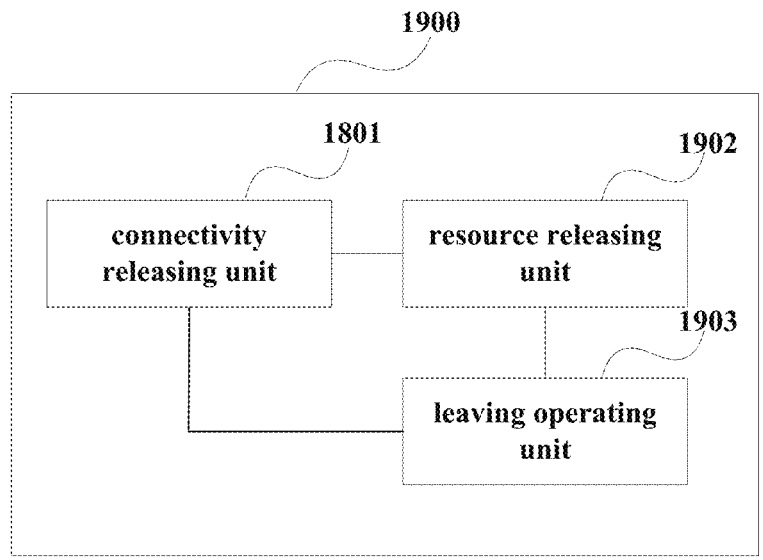
FIG. 19 is another schematic diagram of the structure of the UE of Embodiment 4 of the present disclosure.

In an implementation, the UE may release the second connectivity first, and then performs the operation leaving the connected state as provided in an existing protocol. FIG. 19 is another schematic diagram of the structure of the UE of the embodiment of the present disclosure. As shown in FIG. 19, the UE 1900 includes a connectivity releasing unit 1801, as described above.

As shown in FIG. 19, the UE 1900 may further include a resource releasing unit 1902. The resource releasing unit 1902 is configured to stop other timers related to the second connectivity other than those that should be operated in an idle state, and release all radio resources related to the second connectivity.

As shown in FIG. 19, the UE 1900 may further include a leaving operating unit 1903. The leaving operating unit 1903 is configured to perform an operation leaving a connected state, the operation being performed according to an existing protocol.

Figure 20:
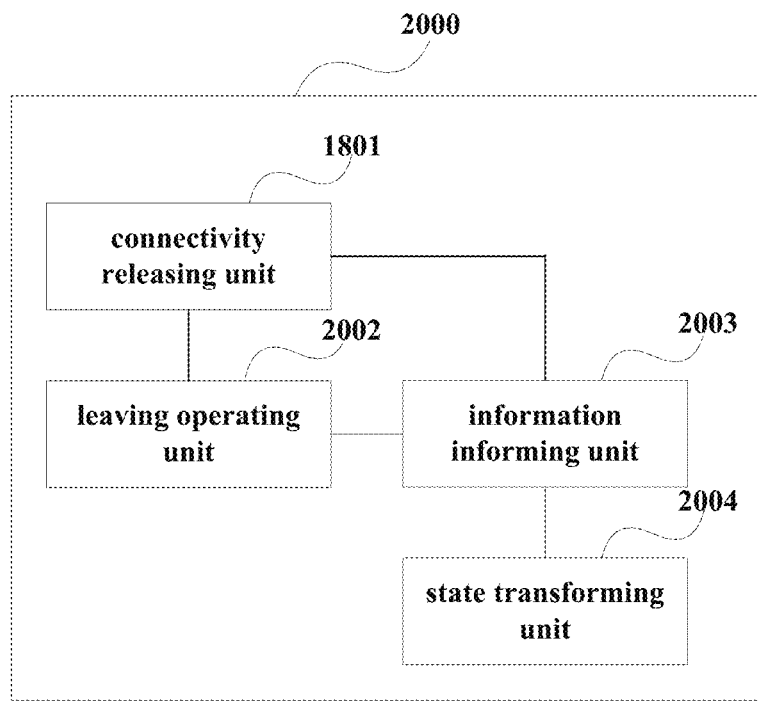
FIG. 20 is a further schematic diagram of the structure of the UE of Embodiment 4 of the present disclosure.

In another implementation, the UE may release the second connectivity and perform the operation leaving the connected state at the same time. FIG. 20 is a further schematic diagram of the structure of the UE of the embodiment of the present disclosure. As shown in FIG. 20, the UE 2000 includes a connectivity releasing unit 1801, as described above.

As shown in FIG. 20, the UE 2000 may further include a leaving operating unit 2002. The leaving operating unit 2002 is configured to perform an operation leaving a connected state, including resetting an MAC entity of the first connectivity; stopping other timers corresponding to the first connectivity and the second connectivity other than those that should be operated in an idle state; and releasing all radio resources related to the two pieces of connectivity.

As shown in FIG. 20, the UE 2000 may further include an information informing unit 2003 and a state transforming unit 2004. The information informing unit 2003 is configured to inform a higher layer that RRC connection has been released and inform a cause, and when the cause of leaving an RRC connected state is neither receiving "a command of moving from E-UTRA", nor selecting a cross RAT cell as the timer T311 is in operation, the state transforming unit 2004 is configured to make the UE enter into the idle state.

Figure 21:
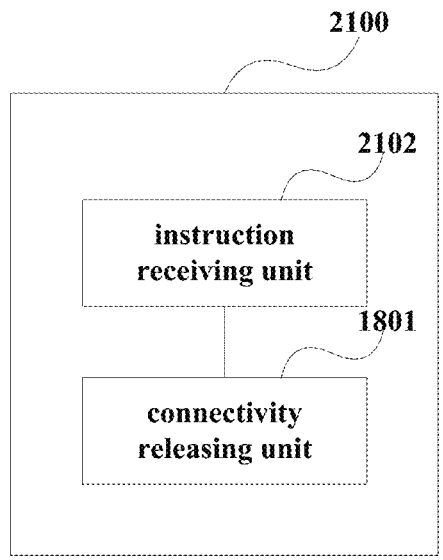
FIG. 21 is still another schematic diagram of the structure of the UE of Embodiment 4 of the present disclosure.

In another implementation, the UE may release the MAC entity of the second connectivity in receiving an instruction for releasing the second connectivity. FIG. 21 is still another schematic diagram of the structure of the UE of the embodiment of the present disclosure. As shown in FIG. 21, the UE 2100 includes a connectivity releasing unit 1801, as described above.

As shown in FIG. 21, the UE 2100 may further include an instruction receiving unit 2102 configured to receive an instruction for releasing the second connectivity. The instruction may be from the base station, and may also be from internal of the UE, such as releasing the second connectivity resulted from other operations of the UE.

In a particular implementation, the connectivity releasing unit 1801 may further be configured to stop all timers related to the second connectivity, and release all radio resources related to the second connectivity, including releasing all RLC entities in the second connectivity where radio bearer has been established and associated PDCP entities. Particular functions may be determined according to an actual situation.

Figure 22:
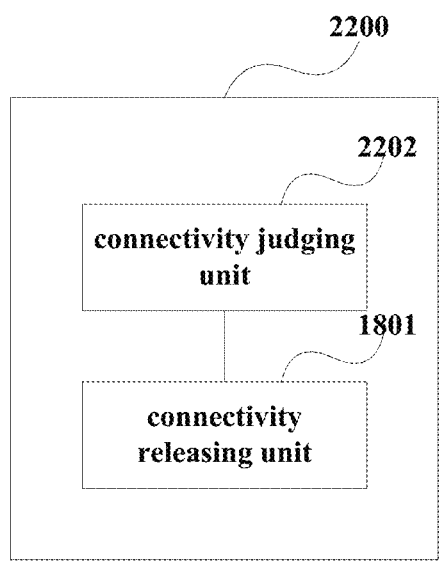
FIG. 22 is yet another schematic diagram of the structure of the UE of Embodiment 4 of the present disclosure.

FIG. 22 is yet another schematic diagram of the structure of the UE of the embodiment of the present disclosure. As shown in FIG. 22, the UE 2200 includes a connectivity releasing unit 1801, as described above.

As shown in FIG. 22, the UE 2200 may further include a connectivity judging unit 2202 configured to judge whether the UE has dual connectivity including the first connectivity and the second connectivity; and the connectivity releasing unit 1801 is configured to release the MAC entity of the second connectivity if it is judged that the UE has dual connectivity.

It can be seen from the above embodiment that by releasing the MAC entity to which the second connectivity corresponds in the dual connectivity architecture, the UE resources may be efficiently managed, and waste of resources may be reduced based on control optimization.

Embodiment 5

An embodiment of the present disclosure further provides a communication system, including the UE as described in Embodiment 3, or the UE as described in Embodiment 4.

Figure 23:
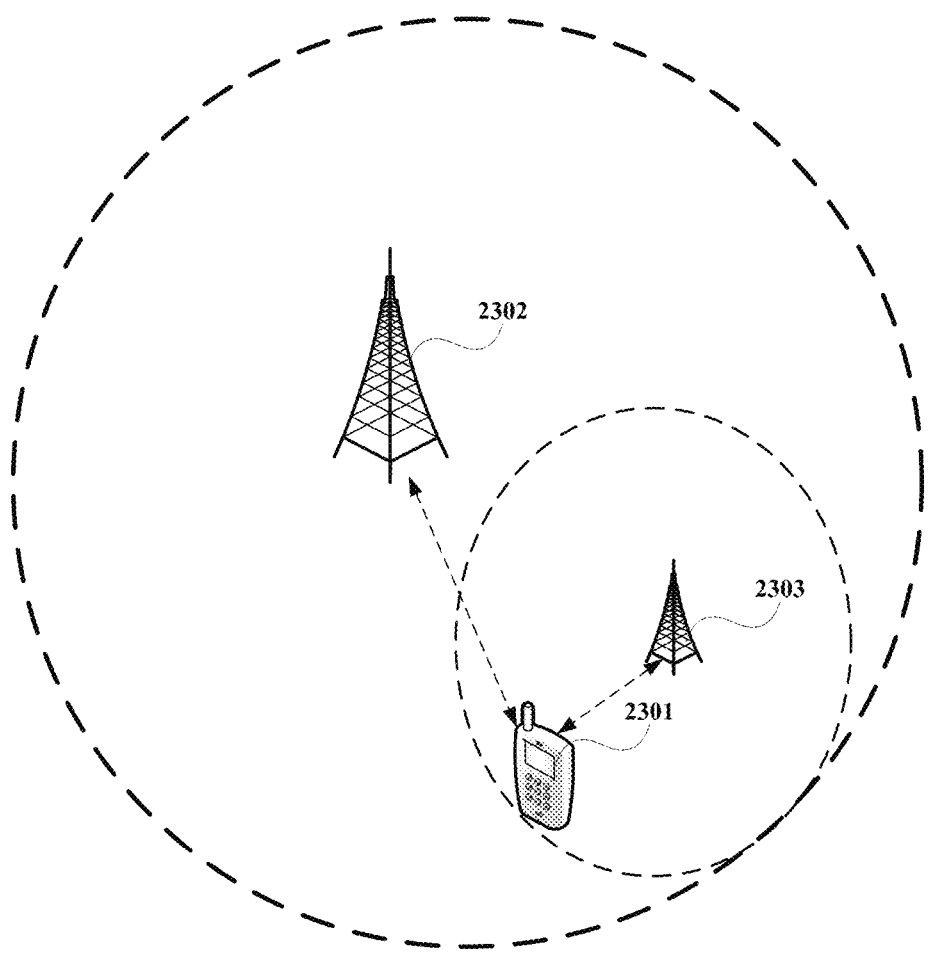
FIG. 23 is a schematic diagram of a structure of a communication system of Embodiment 5 of the present disclosure.

FIG. 23 is a schematic diagram of a structure of the communication system of the embodiment of the present disclosure. As shown in FIG. 23, the communication system includes UE 2301 configured to communicate with a macro base station 2302 or a small cell base station 2303 via dual connectivity.

An embodiment of the present disclosure further provides a computer-readable program, wherein when the program is executed in UE, the program enables a computer to carry out the method for processing an MAC entity as described in Embodiment 1 or 2 in the UE.

An embodiment of the present disclosure further provides a storage medium in which a computer-readable program is stored, wherein the computer-readable program enables a computer to carry out the method for processing an MAC entity as described in Embodiment 1 or 2 in UE.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

One or more functional blocks and/or one or more combinations of the functional blocks in Figure may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof. And they may also be realized as a combination of computing equipment, such as a combination of a DSP and a microprocessor, multiple processors, one or more microprocessors in communication combination with a DSP, or any other such configuration.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A method for processing a medium access control (MAC) entity, comprising:
    establishing, by a User Equipment (UE), a corresponding MAC entity for a second connectivity, so that there exists dual connectivity between the UE and network side comprising a first connectivity and the second connectivity,
    wherein PDCP entity and RLC entity both exist in the first and second connectivity or PDCP entity and RLC entity exist in the first connectivity, RLC entity exists in the second connectivity, and
    wherein a radio resource control (RRC) exists in the first connectivity and signaling radio bearer(s) (SRB(s)) is/are always transferred via the first connectivity, while the MAC entity of the second connectivity comprises a multiplexing or de-multiplexing module, a logic channel prioritization module, a control module, a random access control module and a hybrid automatic repeat request module; and
    releasing, by the UE, all radio resources related to the second connectivity, stopping timers related to the second connectivity and flushing hybrid automatic repeat request (HARQ) of the MAC entity of the second connectivity when the UE receives an instruction for releasing the second connectivity.

2. The method according to claim 1, wherein the method further comprises:
    releasing, by the UE, the MAC configuration of the second connectivity when the UE receives an instruction for releasing the second connectivity.

3. The method according to claim 1, wherein the method further comprises:
    performing, by the UE, an operation leaving a connected state instead of when the UE receives an instruction for releasing the second connectivity.

4. A User Equipment (UE), comprising:
    a receiver configured to receive an instruction for releasing a second connectivity; and
    processor circuitry configured to establish a corresponding medium access control (MAC) entity for the second connectivity, so that there exists dual connectivity between the UE and network side comprising a first connectivity and the second connectivity,
    wherein PDCP entity and RLC entity both exist in the first and the second connectivity or PDCP entity and RLC entity exist in the first connectivity, RLC entity exists in the second connectivity, and
    wherein a radio resource control (RRC) exists in the first connectivity and signaling radio bearer(s) (SRB(s)) is/are always transferred via the first connectivity, while the MAC entity of the second connectivity comprises a multiplexing or de-multiplexing module, a logic channel prioritization module, a control module, a random access control module and a hybrid automatic repeat request module,
    the processor circuitry further configured to stop timers related to the second connectivity, to release all radio resources related to the second connectivity and to flush hybrid automatic repeat request (HARQ) of the MAC entity of the second connectivity.

5. The UE according to claim 4, wherein the processor circuitry is further configured to release the MAC configuration of the second connectivity.

6. The UE according to claim 4, wherein the processor circuitry is further configured to perform an operation leaving a connected state instead of receiving an instruction for releasing the second connectivity.

7. A base station communicates with a user equipment, the base station comprising:
    a transmitter configured to transmit, to the user equipment, a message including an instruction for releasing a second connectivity; and
    a receiver configured to receive a data from the user equipment,
    the user equipment comprising:
    a receiver configured to receive an instruction for releasing the second connectivity; or
    a processor configured to establish a corresponding medium access control (MAC) entity for the second connectivity, so that there exists dual connectivity between the user equipment and network side comprising a first connectivity and the second connectivity,
    wherein PDCP entity and RLC entity both exist in the first and second connectivity or PDCP entity and RLC entity exist in the first connectivity, RLC entity exists in the second connectivity, and wherein a radio resource control (RRC) exists in the first connectivity and signaling radio bearer(s) (SRB(s)) is/are always transferred via the first connectivity, while the MAC entity of the second connectivity comprises a multiplexing or de-multiplexing module, a logic channel prioritization module, a control module, a random access control module and a hybrid automatic repeat request module, the processor further configured to stop timers related to the second connectivity, to release all radio resources related to the second connectivity and to flush hybrid automatic repeat request (HARQ) of the MAC entity of the second connectivity.

\* \* \* \* \*